2,845,394

COMPOSITION FOR DETECTING MOISTURE LEAKAGE

Claude S. Thompson, Elizabeth, N. J.

No Drawing. Application November 15, 1955
Serial No. 547,050

5 Claims. (Cl. 252—408)

(Granted under Title 35, U. S. Code (1952), sec. 266)

The invention described herein may be manufactured and used by or for the Government of the United States of America for governmental purposes without the payment of any royalties thereon or therefor.

This invention relates to moisture indicators and more particularly to a composition effectively utilizable in the detection of steam and hot water leaks.

Indicators used in moisture detection generally consist of a mixture which includes a water-soluble dye or a material which changes color upon reaction with water. The moisture dissolves the dye or reacts with the material with the production of a colored solution that serves as the indicator.

Such moisture indicators cannot practicably be used in detection of steam leaks and hot water leaks in metal containers, and other like devices for several reasons. First, a dye or material that undergoes chemical change upon reaction with moisture will give an indication when the relative humidity reaches a certain level so that indications of the presence of moisture will also occur in the absence of a steam or hot water leak. Secondly, the material such as dyes, etc., used for moisture detection are destroyed at the temperature levels at which steam leaks have to be detected. Thirdly, the conventional moisture detecting materials require visual observation as a drying of the indicating material causes the color to disappear resulting in the concomitant requirement that the location of the leak must be in a position to be observed. Fourthly, these materials are not effective in detecting leaks where the cause of the leaks are minute holes, too small to be detected visually.

Accordingly, it is the primary object of the present invention to provide an indicator for detecting the pressure of water leakage at elevated temperatures which is permanent, stable, does not require visual observation and is effective in detecting water leaks through minute openings.

In accordance with the present invention, there is provided a composition adapted to permanently indicate moisture leakage through small openings in the walls of devices for containing water at elevated temperatures which comprises an intimate admixture of a first powdered material having a first color such as manganese dioxide, ferric oxide and graphite, a second powdered material having a second contrasting color such as lead chloride, the second material being relatively insoluble in water at low temperatures and substantially soluble in water at elevated temperatures, and a binder comprising a water soluble silicate such as sodium silicate, or other gel forming silica or silicate, the first and second materials and the binder being stable at elevated temperatures. A relatively small quantity of water is added to the mixture to permit its application to the surface of the device by such methods as brushing, dipping, or spraying.

Other objects and many of the attendant advantages of this invention will be readily appreciated as the same becomes better understood by reference to the following detailed description:

In the present invention, a composition of matter is provided which, when applied as coating on the device to be leak tested has a uniform shade or color. Where the leak occurs, the hot water or steam causes a substance having white or differing color from the uniform shade of the original composition to be deposited on the surface of the coating, thereby providing a distinctly contrasting color or shade at the point of leakage. The deposited substance either forms white or colored rings or spots immediately over the leak and remains there permanently until removed so that an examination for leakage can be made at any time. The coating is not affected by high humidity nor by temperatures well in excess of 700° F., i. e., the constituents of the coating retain their stability at such elevated temperatures. The coating composition is readily removed with water and simple brushing. This is in contrast to the difficulty encountered in removing presently used moisture detectors which include oil or varnish vehicles or binders and which require for their removal, the use of organic solvents that possess varying degrees of toxicity and inflammability.

In a preferred form of the present invention, there is provided an intimate mixture of a material such as powdered manganese dioxide, powdered ferric oxide powder or graphite, powdered lead chloride, and a binder comprising a water soluble silicate such as sodium silicate which forms a gel or a gel forming silica such as the product sold under the trade name "Ludox." Since manganese dioxide and graphite are black, ferric oxide is red, and the lead chloride is white, the resulting mixture may be a shade of grey or light red. To enable application of the composition to the surface being leak tested by conventional methods such as brushing, dipping or spraying, some water is added to the mixture to form a suspension thereof, the amount of the water depending upon the consistency desired in the suspension. When the water suspension of the mixture is applied to the surface, the water evaporates and an adherent coating of the mixture remains on the surface. Although the proportions of the constituents of the composition of the present invention are not critical, it is desirable that the constituents be present in the mixtures in the range of 50 to 150 parts by weight of either manganese dioxide, ferric oxide or graphite, 150 to 300 parts by weight of lead chloride and 50 to 150 parts by weight of the gel forming silica or sodium silicate. The amount of water added to form the suspension may be 20 to 60 parts by weight.

Within the foregoing ranges of constituents, one mixture which gave excellent results comprised 100 parts by weight of manganese dioxide, 200 parts by weight of lead chloride, and 100 parts by weight of "Ludox." The mixture is readily accomplished by intimately mixing the constituents in a mortar or ball mill. The mixtures are then agitated in about 40 parts by weight water to form the suspension.

In operation, as steam or hot water at a point of leakage in a steam pipe, metal container, or other steam containing equipment passes through the leakage opening in the wall and through the thickness of the applied coating, it dissolves the lead chloride in its path in the coating and carries it to the surface of the coating where the water evaporates in a very short period, leaving a deposit of white lead chloride on the dark manganese dioxide, graphite or ferric oxide. The lead chloride is comparatively insoluble in water at room temperatures but is sufficiently soluble in hot water and steam to be carried to the surface at which place the water evaporation takes place.

It is seen that since the deposited lead chloride is stable at high temperatures, in excess of 700° C., and since it is only soluble in water at elevated temperatures, the lead chloride will permanently remain at the point of deposition permitting examination for leaks at any time and not requiring immediate visual observation. Also, depositions will occur even if only small pinhole leakage openings are present. The applied coating is readily removed by water and brushing.

Thus, the concept of the present invention is a coating composition including a first background material that is of one color, a second material of a contrasting color which is substantially insoluble in water at room temperatures but quite soluble in water at elevated temperatures and a binder. Both materials and the binder should be stable at elevated temperatures, i. e., not be chemically reactive at such temperatures. With such a composition, no chemical reaction will take place in the presence of relatively high humidity and the second material will be deposited upon the first material only when leakage of hot water or steam occurs.

Obviously many modifications and variations of the present invention are possible in the light of the above teachings. It is therefore to be understood that within the scope of the appended claims the invention may be practiced otherwise than as specifically described.

I claim:

1. A composition for application as a permanent coating to the exterior surface of a container for water at elevated temperatures and through which surface said water may leak, which when applied as a coating and dried will be resistant to high atmospheric humidity and temperatures to which it may be exposed, and which when so applied will clearly indicate the existence and location of any such leak that may subsequently develop, which comprises a coating mixture containing a first powdered material of lead chloride which is substantially insoluble and chemically stable in water at approximately usual room temperatures and below, but substantially soluble and chemically stable in water at temperatures well above the usual room temperatures, a second powdered material selected from the group consisting of manganese dioxide, ferric oxide, and graphite having a color substantially contrasting with that of said first powdered material, insoluble in water at all temperatures, and chemically stable at temperatures within the range to which said surface may be subjected, and a gel-like binder containing a compound of silicon in an aqueous carrier medium which binder is chemically stable and substantially unaffected by high atmospheric humidity and temperatures from below room temperatures to temperatures above those to which the coating may be exposed in use, whereby when a leak of water at elevated temperatures occurs in said surface covered by said coating, said first powdered material at the leak will be dissolved by the escaping water and carried to the surface of the coating where the escaping water carrier will evaporate and leave a deposit of said first powdered material on the surface of the coating where its color contrasting with that of the coating will indicate the existence and location of a leak in said container.

2. The composition as set forth in claim 1, wherein the binder is sodium silicate.

3. The composition as set forth in claim 1, wherein said first powdered material is powdered lead chloride, and the binder is a gel forming silicate.

4. The composition as set forth in claim 1, wherein the portions of the components are approximately 100 to 300 parts by weight of said first material, 50 to 100 parts by weight of said second material, 50 to 150 parts by weight of said binder, and 20 to 60 parts by weight of water whereby to make the composition sufficiently fluid as to be readily applicable to said surface of said container.

5. A composition for application as a permanent coating to the exterior surface of a container for water at elevated temperatures and through which surface said water may leak, which when applied as a coating and dried will be resistant to high atmospheric humidity and temperatures to which it may be exposed, and which when so applied will clearly indicate the existence and location of any such leak that may subsequently develop, which comprises a coating mixture containing a first powdered material of lead chloride, a second powdered material of manganese dioxide, which is a dark colored material which is insoluble in water at all temperatures within the range to which the said surface may be subjected in use, and a binder of sodium silicate, whereby when a leak of water at elevated temperature occurs in said surface covered by said coating, the lead chloride at and adjacent the leak will be dissolved and the binder softened by the moisture escaping through the leak, and the dissolved lead chloride will be carried to the exposed face of the coating where the escaping moisture will evaporate and leave a deposit of lead chloride so that its white color on the darker coating will indicate the existence and location of a leak in said container.

References Cited in the file of this patent

UNITED STATES PATENTS

| | | |
|---|---|---|
| 1,422,130 | Reynolds | July 11, 1922 |
| 1,489,247 | Hill | Apr. 8, 1924 |
| 2,254,609 | Kinzer | Sept. 2, 1941 |